United States Patent
Shi et al.

(10) Patent No.: US 9,954,577 B2
(45) Date of Patent: Apr. 24, 2018

(54) METHOD AND SYSTEM OF COMBINING SIGNALS IN BPL COMMUNICATIONS

(71) Applicant: Corinex Communications Corporation, Vancouver (CA)

(72) Inventors: Sam Shi, Burnaby (CA); Peter Sobotka, Vancouver (CA); Brian Donnelly, Vancouver (CA)

(73) Assignee: CORINEX COMMUNICATIONS CORPORATION, Vancouver (CA)

( * ) Notice: Subject to any disclaimer, the term of this patent is extended or adjusted under 35 U.S.C. 154(b) by 25 days.

(21) Appl. No.: 13/733,812

(22) Filed: Jan. 3, 2013

(65) Prior Publication Data

US 2017/0257145 A1 Sep. 7, 2017

Related U.S. Application Data

(63) Continuation of application No. 12/847,896, filed on Jul. 30, 2010, now abandoned, and a continuation of application No. 11/613,081, filed on Dec. 19, 2006, now abandoned.

(51) Int. Cl.
*H04J 3/22* (2006.01)
*H04B 3/58* (2006.01)

(52) U.S. Cl.
CPC ....... *H04B 3/58* (2013.01); *H04B 2203/5479* (2013.01)

(58) Field of Classification Search
CPC .......... H04B 3/54; H04B 3/542; H04B 3/544; H04B 3/546; H04B 3/548; H04B 3/56; H04B 3/58; H04B 2203/5462; H04B 2203/547; H04B 2203/5479

See application file for complete search history.

(56) References Cited

U.S. PATENT DOCUMENTS

| | | | | |
|---|---|---|---|---|
| 6,418,558 | B1 * | 7/2002 | Roberts | G06F 17/14 348/E7.07 |
| 7,755,452 | B2 * | 7/2010 | Knickerbocker | H01P 5/16 330/124 R |
| 8,149,106 | B2 * | 4/2012 | Refaeli | H04B 3/542 340/12.32 |
| 2004/0147229 | A1 * | 7/2004 | McGrath | G11B 20/10037 455/76 |
| 2006/0125421 | A1 * | 6/2006 | Costa | H02J 3/14 315/294 |
| 2006/0291546 | A1 * | 12/2006 | Zitting | H04B 3/542 375/222 |
| 2008/0112474 | A1 * | 5/2008 | Refaeli | H04B 3/542 375/222 |
| 2008/0129533 | A1 * | 6/2008 | Wang | H04B 3/544 340/12.32 |
| 2008/0247537 | A1 * | 10/2008 | Henry | H04B 3/28 379/416 |

(Continued)

*Primary Examiner* — Kevin Mew
(74) *Attorney, Agent, or Firm* — Gardiner Roberts LLP

(57) ABSTRACT

A system for communicating BPL signals is provided, including a BPL modem having a first internal modem and a second internal modem, the first internal modem and the second internal modem each in communication with a RF combiner; the RF combiner in communication with a medium voltage power line; and wherein the RF combiner combines signals from the first internal modem and the second internal modem into a single signal, and communicates the single signal to the medium voltage power line.

18 Claims, 5 Drawing Sheets

(56) References Cited

U.S. PATENT DOCUMENTS

| | | | |
|---|---|---|---|
| 2009/0281679 A1* | 11/2009 | Taft | G01D 4/004 700/297 |
| 2009/0307302 A1* | 12/2009 | Tennant | G06F 17/30132 709/203 |
| 2010/0073193 A1* | 3/2010 | Flammer, III | H04B 3/546 340/870.11 |
| 2010/0079004 A1* | 4/2010 | Keefe | B60L 11/1842 307/80 |
| 2010/0296560 A1* | 11/2010 | Sadan | H04B 3/56 375/222 |
| 2012/0099627 A1* | 4/2012 | Mitchell | H04B 3/546 375/222 |

* cited by examiner

METHOD AND SYSTEM OF COMBINING SIGNALS IN BPL COMMUNICATIONS

CROSS REFERENCE TO RELATED APPLICATIONS

This application is a continuation application of U.S. application Ser. No. 12/847,896 filed Jul. 30, 2010 (now abandoned), which is a continuation application of application Ser. No. 11/613,081 filed Dec. 19, 2006 (now abandoned), which is incorporated herein by reference.

FIELD OF THE INVENTION

The invention relates to broadband over power line ("BPL") communications, and more particularly to such communications between a BPL modem and a medium voltage ("MV") power line.

BACKGROUND OF THE INVENTION

Using BPL communications on MV power lines requires repeating or regenerating signals at various intervals to maintain sufficient signal strength to reach the signal destination. Such signal regeneration may be done by BPL modems connected to the MV power line. When multiple devices try to communicate over a single physical line, the devices must follow a specified scheme to share the physical resource and to avoid interfering with each other. There are two such schemes commonly used, one referred to as Time Division Duplexing ("TDD"), and the other as Frequency Division Duplexing ("FDD").

TDD is a scheme whereby devices split up a period of time T (seconds) into N divisions, with each device being given T/N (seconds) of the total time T in which to communicate over the single line. Each device waits for its specific time slot and when its turn arrives, the device uses the full frequency band available to communicate.

FDD is a scheme whereby devices split up the total frequency band F (measured in Hertz), into N divisions, with each device being given F/N (Hertz) of the total F band in which to communicate. Each device communicates as required (as opposed to TDD where a device only communicates in its own designated time division) but only in its allocated frequency band (as opposed to TDD where a device uses the full frequency band to communicate).

When using FDD (which is the most efficient way of building large networks) BPL modems require at least two internal modems and corresponding ports, one for upstream communication along the MV power line, and one for downstream communication along the MV power line. Each port is connected to a MV coupler used to couple the signal from the internal modem to the MV power line.

FIG. 1 shows a typical BPL access system over MV power line 100 utilizing FDD for repeating the BPL signal. BPL modem 110 has two ports, 120 and 130, for input and output, for upstream and downstream communications, respectively. Each port 120, 130 is connected to a coupler 140, 150.

BPL modem 110 also acts as a repeater. BPL signal 1 is received and "repeated" (i.e. the signal is regenerated and retransmitted) and sent out as BPL signal 2 and vice versa. BPL Modem 10 typically includes two internal modems (and may have more) for FDD repeating. In FDD communications, when the signal is repeated a different frequency band is used for the upstream and downstream directions of communication, respectively, but BPL modem 110 is transmitting/receiving constantly (unlike TDD communications wherein a time slot is assigned).

SUMMARY OF THE INVENTION

The system and method according to the invention allows for a BPL MV communications system on power utility grid that eliminates the need for two MV couplers per BPL modem (one for each of two communication directions) when utilizing FDD. This is achieved by combining the upstream and downstream signal outputs from a BPL modem prior to coupling to the MV power line. The combining of the signals can occur internal or external to the BPL modem.

The system and method according to the invention provides for fewer safety concerns as linemen interact less with the MV power lines (as they only attach one coupler). Such MV power lines have the potential to injure or kill a person.

The system and method according to the invention decreases the expense of using two couplers per modem, and provides for fewer points of failure and less time and cost to install. As couplers are similar in expense to BPL modem, the elimination of a coupler reduces the deployment hardware costs of a BPL system significantly (e.g. by 25-35%).

A method of communicating signals from a BPL modem to a medium voltage power line, is provided, including communicating a first signal for a medium voltage power line from a first signal source; communicating a second signal for the medium voltage power line from a second signal source; combining the first and second signals into a third signal prior to the signals reaching the medium voltage power line; and communicating the third signal to the medium voltage power line.

The first signal source may be a first internal modem within a BPL modem and the second signal source may be a second internal modem within the BPL modem. The first and second signals may be combined by a Radio Frequency ("RF") combiner.

The first signal may pass through a first RF filter prior to reaching the RF combiner and the second signal may pass through a second RF filter prior to reaching the RF combiner. After passing through the first RF filter, the first signal may have a first allotted bandwidth and after passing through the second RF filter, the second signal may have second allotted bandwidth, the first allotted bandwidth not overlapping with the second allotted bandwidth.

A system for communicating BPL signals is provided, including a BPL modem having a first internal modem and a second internal modem, the first internal modem and the second internal modem each in communication with a RF combiner; the RF combiner in communication with a medium voltage power line; and wherein the RF combiner combines signals from the first internal modem and the second internal modem into a third signal, and communicates the third signal to the medium voltage power line.

The first internal modem may communicate upstream signals and the second internal modem may communicate downstream signals. The system may include a first RF filter in communication with the first internal modem and the RF combiner and a second RF filter in communication with the second internal modem and the RF combiner. The first signal may have a first allotted bandwidth, wherein the first RF filter filters a first signal from the first internal modem to the first allotted bandwidth. The second signal may have a second allotted bandwidth, the first allotted bandwidth not overlapping with the second allotted bandwidth, wherein the second RF filter filters a second signal from the second internal modem to the second allotted bandwidth.

DETAILED DESCRIPTION OF THE INVENTION

Figure 1:
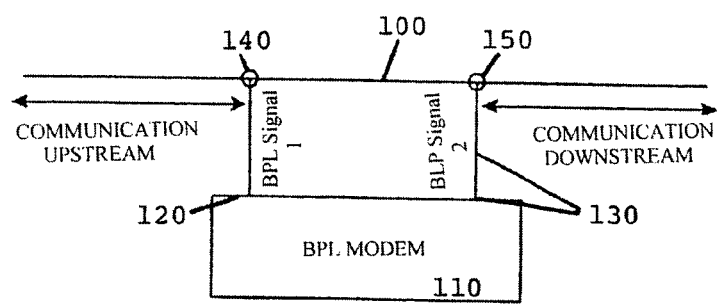
FIG. 1 is a block diagram of a typical prior art BPL access system using two MV couplers.
Figure 2:
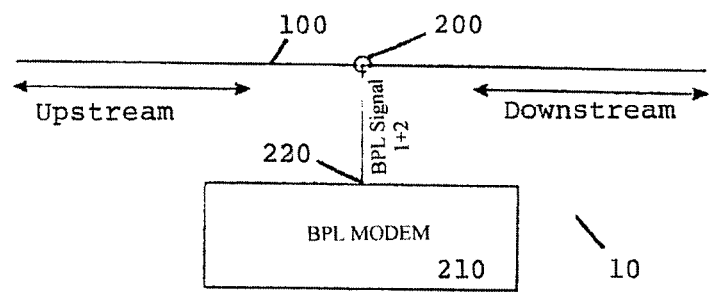
FIG. 2 is a block diagram of a BPL access system using FDD with a single MV coupler according to the invention.

As shown in FIG. 2, a BPL access system according to the invention, generally designated as 10, communicating over MV power line 100 and using FDD to combine BPL Signal 1 and BPL Signal 2 into BPL Signal 1+2, requires only one MV coupler 200, which provides for both upstream and downstream traffic along MV power line 100. BPL modem 210 therefore requires only a single input/output port 220, in the case where RF combiner is internal to BPL modem 210.

Figure 3:
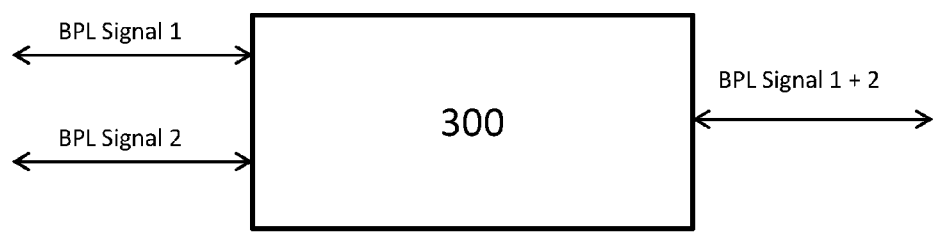
FIG. 3 is a block diagram showing the combination of two different BPL signals using FDD.

FIG. 3 shows how BPL signal 1 and BPL signal 2 (one intended for upstream communications, the other for downstream) are combined into one signal, BPL Signal 1+2. As BPL signal 1 and BPL signal 2 are in different frequency bands according to FDD, they can be combined with minimal interference. RF combiner 300 is used to combine BPL signal 1 and BPL signal 2. RF combiner 300 can be an off the shelf component (when external to modem 210) or can be positioned within BPL modem 210.

Figure 4:
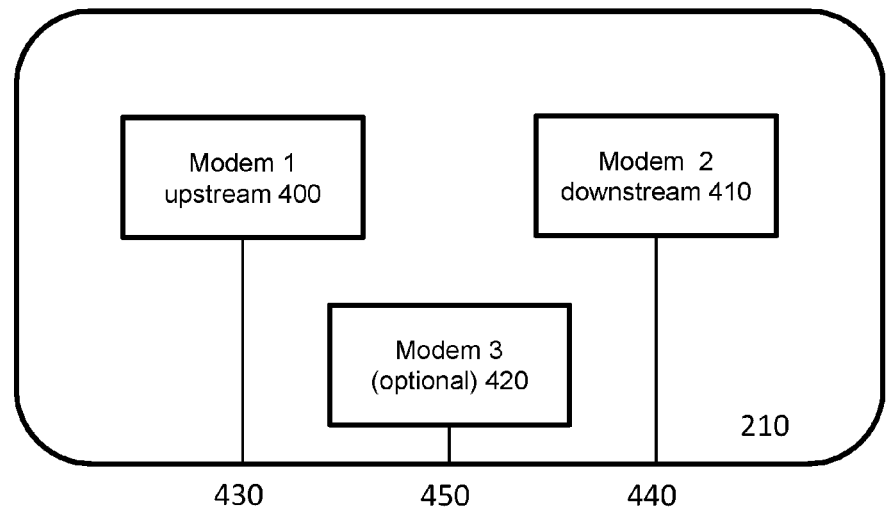
FIG. 4 is a block diagram of a BPL modem.
Figure 8:
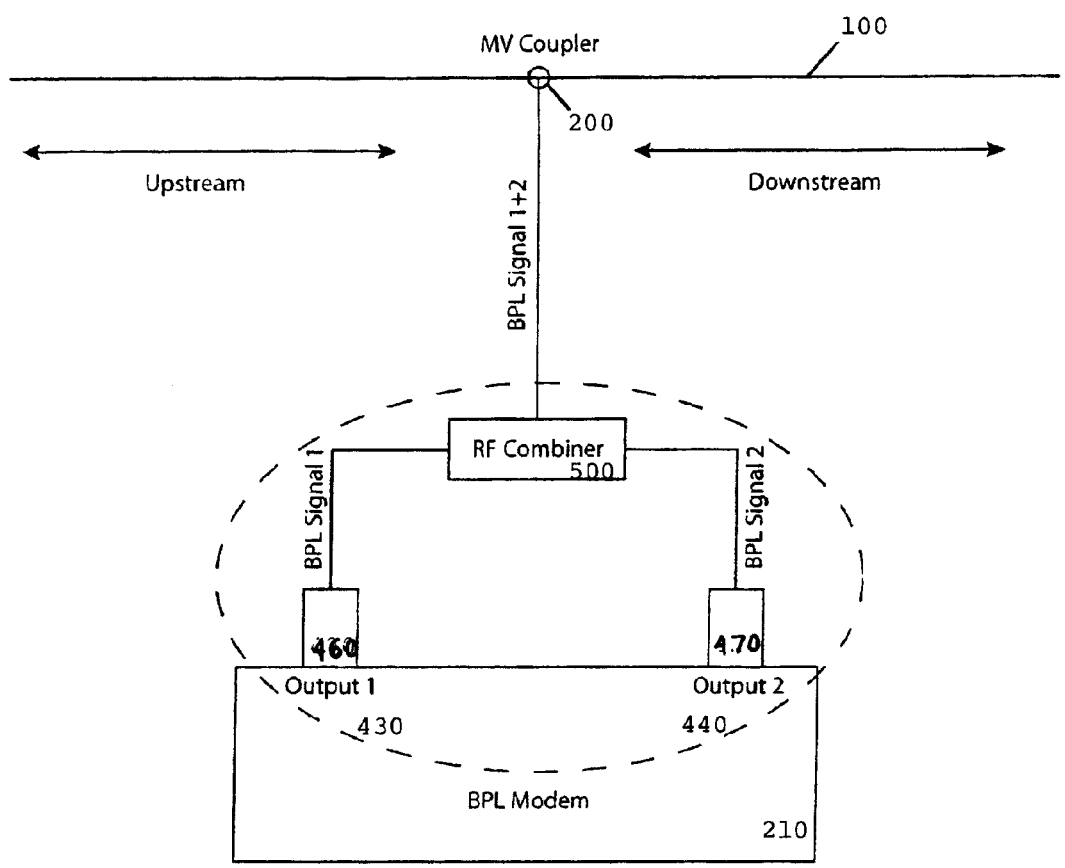
FIG. 8 is a block diagram of a BPL access system according to the invention.

As shown in FIG. 4, BPL modem 210 may have multiple internal modems 400, 410, and 420, within for upstream, downstream and other communications, such as low voltage (LV) BPL communications, and therefore multiple input/output ports 430, 440, and 450 corresponding to each internal modem. Multiple internal modems 400, 410 and 420 allow BPL modem 210 to function as a repeater as well as act as a source of, i.e. originate, and receive BPL signals. BPL modem 210 may have more or less internal modems and corresponding input/output ports. The signals from multiple input/output ports 430, 440 and 450 may be combined into a single input/output line if they use different frequency bands according to FDD. RF filters 460, 470, as seen in FIG. 8, are used to ensure the frequency bands of each of internal modem 400 and 410 do not overlap due to frequency response roll offs, i.e. slopes, that are insufficiently steep.

Certain challenges are presented in combining signals in BPL communications, including signal reflections and signal isolation. Signal reflections occur when impedance mismatches take place on a MV power line, which occur when connecting devices, such as BPL modems, to a MV power line. Two types of signal reflections occur frequently within RF combiners when combining signals, as described below, and shown in FIGS. 5 and 6.

Figure 7:
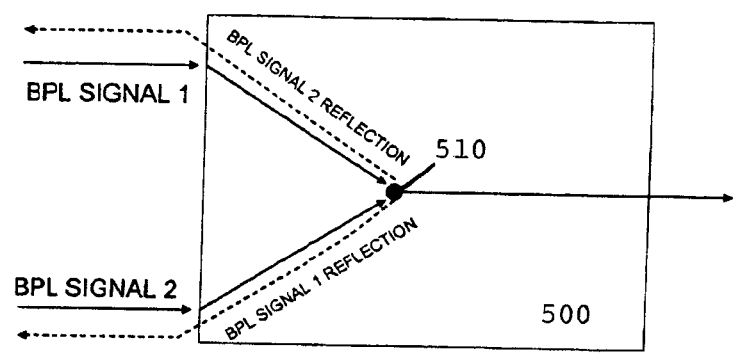
FIG. 7 is a block diagram of internal signal leakage occurring within a RF combiner.

Another obstacle to signal combination is the need for signal isolation between two input/output ports 430, 440 of the modems 400 and 410, respectively, to prevent unwanted signal leakage from one port to the other. FIG. 7 shows the potential signal leakage that can occur within RF combiner 500 without proper isolation between the two ports 430, 440.

Figure 5:
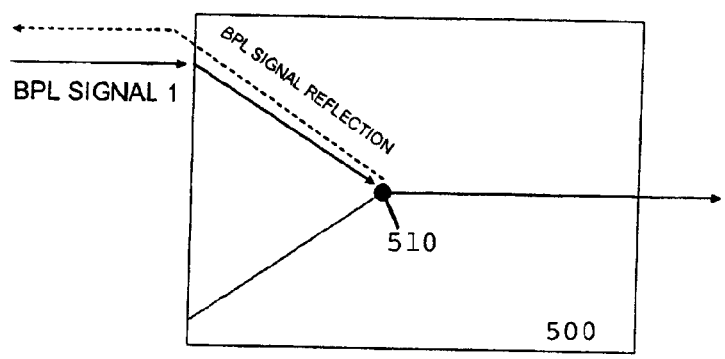
FIG. 5 is a block diagram of BPL internal signal reflection occurring within a RF combiner.

FIG. 5 shows BPL signal 1 entering RF combiner 500 from input/output port 430. RF combiner 500 can be mounted internally or externally to BPL modem 210 and can be part of the circuit board to avoid having to use additional components. For BPL communications, RF combiner typically has a strong frequency response in the range of 1-40 MHz, although BPL communications are not restricted to these frequencies and the frequency response range could be greater. A portion of BPL signal 1 is reflected back upon itself when it reaches the physical location point 510 where the signal combination occurs within RF combiner 500. This signal reflection acts as interference and significantly degrades the performance of the BPL communication system.

Figure 6:
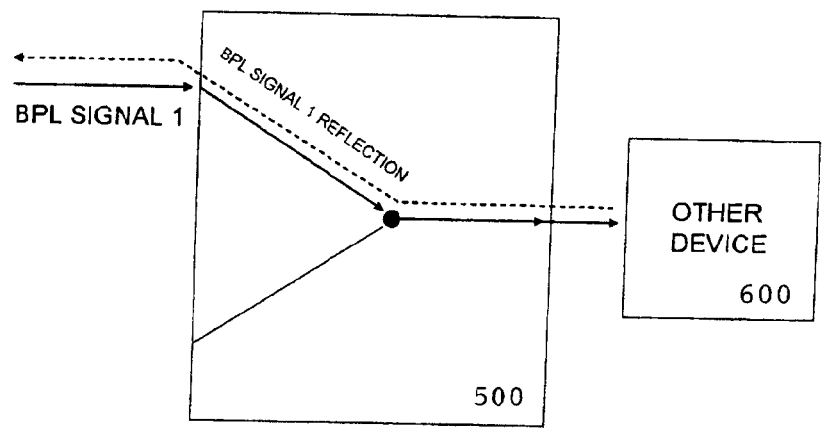
FIG. 6 is a block diagram of BPL external signal reflection occurring within a RF combiner.

FIG. 6 shows BPL signal 1 entering RF combiner 500 and then being reflected back upon itself when it reaches external device 600, which may be a MV coupler, a transformer or other BPL communications device. This signal reflection acts as interference and significantly degrades the performance of the BPL communication system.

FIG. 7 shows BPL signal 1 and BPL signal 2, from internal modem 400 and 410, respectively, entering RF combiner 500, in which BPL signal 1 leaks back upon BPL signal 2's path when BPL signal 1 reaches the physical location point 510 where BPL signal 1 combines with BPL signal 2. Likewise, BPL signal 2 enters combiner 500 and then leaks back upon BPL signal 1's path when BPL signal 2 reaches the physical location point 510 where the BPL signals 1 and 2 combine. This signal leakage acts as interference and significantly degrades the performance of the BPL communications system.

To prevent signal reflection and signal leakage there must be specific attenuations introduced within RF combiner 500 (regardless of whether combiner 500 is located internal to or external from BP modem 210). The attenuation to prevent reflections, as seen in FIGS. 5 and 6 and as known in the art as "return loss", should be as large as possible (typically 25 dB or more to be effective). The attenuation between input/output ports is known in the art as "port to port attenuation" or "port isolation" and should also be as large as possible (typically 30 dB or more to be effective).

Normal BPL signal flow (i.e. BPL Signal 1 and BPL Signal 2 and the combined BPL Signal 1+2 traveling in both directions) is not attenuated, even in the presence of high port isolation and high return loss, as if BPL Signal 1 and BPL Signal 2 are attenuated, then the transmission power of these signals is reduced (and have a lower signal to noise ratio) and the signals may thus lose throughput. RF combiner 500 should therefore be selected or designed with the above attenuation specifications to provide maximum signal to noise ratio and minimal interference.

A challenge in combining signals is thus minimizing interference between the different signals, BPL signal 1 and BPL signal 2, being combined. As seen in FIG. 8, filters 460, 470 are used for corresponding input/output ports 430, 440. Filters 460, 470 are RF filters that are allotted a particular frequency band (pursuant to FDD). For example, first internal modem 400 may be designated to communicate within frequencies between 2-12 MHz and second internal modem 410 may be designated to communicate within frequencies between 12-22 MHz, in which case, RF filters 460, 470 ensure that internal modems 400, 410 do not use frequencies outside those designated bands. Typical frequency bands may be 2-12, 13-23, or 24-34 MHz if three frequency modes are allotted. More or less frequency bands may be allotted and the available bandwidth may be broken up differently (for example the bandwidth split does not have to evenly split the entire bandwidth available). The frequency roll off on the RF filter should be sufficiently steep to ensure minimal out of band communications (e.g. an $8^{th}$ order RF filter).

As seen in FIG. 8, internal modems 400 and 410, are in communication with RF combiner 500 via conventional wires or the like. RF combiner 500 is similarly in communication MV power line 100. RF filters 460, 470 receive communications from internal modems 400 and 410 respectively, and communicate the filtered communications to RF combiner 500. Therefore, the signals from internal modems 400, 410 pass through RF filters, 460, 470 before arriving at RF combiner 500. As shown by the dashed lines, RF combiner 500 and RF filters 460, 470 may be internal or external to BPL modem 210.

Signals communicated from the MV power line 100 through MV coupler 200 can be separated. Such signals will be filtered by RF filters 460, 470 for their respective input/output ports 430, 440.

Although the particular preferred embodiments of the invention have been disclosed in detail for illustrative purposes, it will be recognized that variations or modifications of the disclosed apparatus lie within the scope of the present invention.

The invention claimed is:

1. A method of communicating signals from a broadband over powerline (BPL) modem to a medium voltage power line, comprising:
    a) communicating a first signal for a medium voltage power line from a first signal source;
    b) communicating a second signal for the medium voltage power line from a second signal source;
    c) combining the first and second signals within a radio frequency (RF) combiner into a third signal prior to the signals reaching the medium voltage power line, where as part of the third signal, the first signal is allotted in a first bandwidth and the second signal is allotted in a second bandwidth that does not overlap with the first bandwidth;
    d) attenuating the first and second signals within the RF combiner; and
    e) communicating the third signal to the medium voltage power line.

2. The method of claim 1, wherein the first signal source is a first internal modem within a BPL modem.

3. The method of claim 2, wherein the second signal source is a second internal modem within the BPL modem.

4. The method of claim 1, wherein the first signal passes through a first RF filter that allots the first signal in the first bandwidth prior to reaching the RF combiner.

5. The method of claim 4, wherein the second signal passes through a second RF filter that allots the second signal in the second bandwidth prior to reaching the RF combiner.

6. A system for communicating broadband over powerline (BPL) signals, comprising:
    a) a BPL modem having a first internal modem and a second internal modem, the first internal modem and the second internal modem each in communication with a radio frequency (RF) combiner; and
    b) the RF combiner in communication with a medium voltage power line, wherein the RF combiner
    combines signals from the first internal modem and the second internal modem into a third signal having the signals from the first internal modem allotted in a first bandwidth and the signals from the second internal modem allotted in a second bandwidth that does not overlap with the first bandwidth, and
    communicates the third signal to the medium voltage power line.

7. The system of claim 6, wherein the first internal modem communicates upstream signals.

8. The system of claim 7, wherein the second internal modem communicates downstream signals.

9. The system of claim 8, further comprising a first RF filter in communication with the first internal modem and the RF combiner.

10. The system of claim 9, further comprising a second RF filter in communication with the second internal modem and the RF combiner.

11. The system of claim 10, wherein the first RF filter filters the signals from the first internal modem to the first allotted bandwidth.

12. The system of claim 11, wherein the second RF filter filters the signals from the second internal modem to the second allotted bandwidth.

13. The system of claim 11, wherein the RF combiner communicates the third signal to the medium voltage power line through a medium voltage coupler.

14. The system of claim 11, wherein the first and second bandwidths are in the range of 1-40 MHz.

15. The method of claim 1, wherein the third signal is communicated to the medium voltage power line through a medium voltage coupler.

16. The method of claim 1, wherein the first and second bandwidths are in the range of 1-40 MHz.

17. A broadband over powerline (BPL) modem connected to a medium voltage power line, the BPL modem comprising:
    a first modem for communicating upstream communications in the medium voltage power line;
    a second modem for communicating downstream communications in the medium voltage power line; and
    a radio frequency (RF) combiner in communication with the first and second modems and with the medium voltage power line, the RF combiner for combining signals from the first and the second modems into a third signal having the upstream communications allotted in a first bandwidth and the downstream communications allotted in a second bandwidth that does not overlap with the first bandwidth, and for communicating the third signal to the medium voltage power line.

18. The broadband over powerline (BPL) modem of claim 17, further comprising:
    a first RF filter that allots the upstream communications in the first bandwidth prior to reaching the RF combiner; and
    a second RF filter that allots the downstream communications in the second bandwidth prior to reaching the RF combiner,
wherein the first and second bandwidths are in the range of 1-40 MHz.

* * * * *